United States Patent
Yu et al.

(10) Patent No.: US 9,798,923 B2
(45) Date of Patent: Oct. 24, 2017

(54) SYSTEM AND METHOD FOR TRACKING AND RECOGNIZING PEOPLE

(71) Applicant: GENERAL ELECTRIC COMPANY, Schenectady, NY (US)

(72) Inventors: Ting Yu, Santa Clara, CA (US); Peter Henry Tu, Niskayuna, NY (US); Dashan Gao, San Diego, CA (US); Kunter Seref Akbay, Niskayuna, NY (US); Yi Yao, Rexford, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 15/002,672

(22) Filed: Jan. 21, 2016

(65) Prior Publication Data
US 2016/0140386 A1    May 19, 2016

Related U.S. Application Data

(62) Division of application No. 13/306,783, filed on Nov. 29, 2011, now abandoned.

(51) Int. Cl.
G06K 9/00    (2006.01)
G06K 9/62    (2006.01)
(Continued)

(52) U.S. Cl.
CPC ..... G06K 9/00362 (2013.01); G06K 9/00771 (2013.01); G06K 9/6218 (2013.01);
(Continued)

(58) Field of Classification Search
CPC .................................. G06K 9/00295
See application file for complete search history.

(56) References Cited

U.S. PATENT DOCUMENTS 6,698,021 B1 *  2/2004  Amini .............. G08B 13/19656
                                                     348/143
7,023,469 B1 *  4/2006  Olson .................... H04N 7/188
                                                     348/143
(Continued)

FOREIGN PATENT DOCUMENTS

WO    2005114555 A1    12/2005

OTHER PUBLICATIONS

Yu, Ting et al.; "Learning to Recognize People in a Smart Environment", 8th IEEE International Conference on Advanced Video and Signal-based Surveillance, Sep. 2011, p. 1-6.
(Continued)

Primary Examiner — Gandhi Thirugnanam
(74) Attorney, Agent, or Firm — Pabitra K. Chakrabarti

(57) ABSTRACT

A tracking and recognition system is provided. The system includes a computer vision-based identity recognition system configured to recognize one or more persons, without a priori knowledge of the respective persons, via an online discriminative learning of appearance signature models of the respective persons. The computer vision-based identity recognition system includes a memory physically encoding one or more routines, which when executed, cause the performance of constructing pairwise constraints between the unlabeled tracking samples. The computer vision-based identity recognition system also includes a processor configured to receive unlabeled tracking samples collected from one or more person trackers and to execute the routines stored in the memory via one or more algorithms to construct the pairwise constraints between the unlabeled tracking samples.

10 Claims, 6 Drawing Sheets

(51) Int. Cl.
  *G06K 9/66* (2006.01)
  *G06T 7/70* (2017.01)
(52) U.S. Cl.
  CPC ............ *G06K 9/6232* (2013.01); *G06K 9/66* (2013.01); *G06T 7/70* (2017.01)

(56) References Cited

U.S. PATENT DOCUMENTS

| | | | | |
|---|---|---|---|---|
| 7,221,809 | B2* | 5/2007 | Geng | G06K 9/00288 345/419 |
| 7,227,569 | B2* | 6/2007 | Maruya | G08B 13/19608 348/143 |
| 7,227,976 | B1* | 6/2007 | Jung | G06K 9/00228 345/419 |
| 7,806,604 | B2* | 10/2010 | Bazakos | G06K 9/00255 348/153 |
| 2003/0163289 | A1* | 8/2003 | Whelan | G08B 13/19641 702/188 |
| 2004/0017930 | A1* | 1/2004 | Kim | G06K 9/00228 382/103 |
| 2006/0018518 | A1* | 1/2006 | Fritzsche | B60R 21/01538 382/116 |
| 2006/0158307 | A1* | 7/2006 | Lee | G06K 9/00221 340/5.53 |
| 2006/0187305 | A1* | 8/2006 | Trivedi | G06K 9/00234 348/169 |
| 2007/0194884 | A1* | 8/2007 | Didier | G06K 9/00885 340/5.82 |
| 2007/0237364 | A1* | 10/2007 | Song | G06K 9/00369 382/115 |
| 2008/0114800 | A1* | 5/2008 | Gazen | G06F 17/30861 |
| 2008/0259163 | A1* | 10/2008 | Yu | G06K 9/32 348/169 |
| 2009/0037458 | A1* | 2/2009 | Meyer | G06F 17/30327 |
| 2009/0310862 | A1* | 12/2009 | Tu | G06K 9/00778 382/173 |
| 2010/0245567 | A1* | 9/2010 | Krahnstoever | G06K 9/00295 348/143 |
| 2010/0332425 | A1* | 12/2010 | Tuzel | G06N 99/005 706/12 |
| 2011/0103694 | A1* | 5/2011 | Nakano | G06K 9/00281 382/190 |
| 2011/0302163 | A1* | 12/2011 | Rhinelander | G06F 17/30598 707/737 |
| 2012/0321143 | A1* | 12/2012 | Krupka | G06K 9/00677 382/118 |
| 2013/0136298 | A1* | 5/2013 | Yu | G06K 9/00771 382/103 |
| 2013/0148898 | A1* | 6/2013 | Mitura | G06K 9/62 382/195 |
| 2014/0226861 | A1* | 8/2014 | Zhang | G06K 9/6218 382/103 |
| 2016/0140386 | A1* | 5/2016 | Yu | G06K 9/00771 382/103 |

OTHER PUBLICATIONS

Search Report and Written Opinion from corresponding PCT Application No. PCT/US2012/062020 dated Feb. 15, 2013.
Calderara et al., "Detecting anomalies in peoples trajectories using spectral graph analysis", Computer Vision and Image Understanding, Academic Press, vol. 115, No. 8, pp. 1099-1111, Mar. 15, 2011.
M. Hirzer et al. "Relaxed pairwise learned metric for person re-identification", Proc. IEEE Eur. Conf. Comput. Vision, pp. 780-793, 2012.
Y. Chang et al., "People identification with limited labels in privacy-protected video", In Proc. IEEE Int. Conf. Multimedia and Expo, pp. 1005-1008, Jul. 2006.
R. Yan et al., "A discriminative learning framework with pairwise constraints for video object classification". IEEE transactions on pattern analysis and machine intelligence, vol. 28, No. 4, Apr. 2006.
T. Moeslund et al., "A survey of advances in vision-based human motion capture and analysis". Computer Vision and Image Understanding 104, 2006, pp. 90-126.
H. Wang et al., "FaceTrack: Tracking and summarizing faces from compressed video". 1999, SPIE Photonics East, Conference on Multimedia Storage and Archiving Systems, pp. 1-12.

* cited by examiner

SYSTEM AND METHOD FOR TRACKING AND RECOGNIZING PEOPLE

CLAIMS OF PRIORITY

This application is a divisional application of application Ser. No. 13/306,783, filed on the date of Nov. 29, 2011 and titled System and Method for Tracking and Recognizing People.

BACKGROUND

Smart environments, such as an indoor office and/or living space with ambient intelligence, have been widely adopted in various domains. A prerequisite to taking advantage of the intelligent and context-aware services within these spaces is knowing people's locations and their spatiotemporal context with respect to the environment. Typically, person detectors and video-based person tracking systems with a tracking-by-detection paradigm may be utilized to determine people's location and their spatiotemporal context within the environment. For example, a multi-camera, multi-person tracking system may be utilized to localize and track individuals in real-time. However, various environmental challenges (e.g., harsh lighting conditions, cluttered backgrounds, etc.) may cause tracking errors making it difficult to accurately track multiple people in any real-world scenario.

BRIEF DESCRIPTION

In a first embodiment, a tracking and recognition system is provided. The system includes a computer vision-based identity recognition system configured to recognize one or more persons, without a priori knowledge of the respective persons, via an online discriminative learning of appearance signature models of the respective persons. The computer vision-based identity recognition system includes a memory physically encoding one or more routines, which when executed, cause the performance of constructing pairwise constraints between the unlabeled tracking samples. The computer vision-based identity recognition system also includes a processor configured to receive unlabeled tracking samples collected from one or more person trackers and to execute the routines stored in the memory via one or more algorithms to construct the pairwise constraints between the unlabeled tracking samples.

The computer vision-based identity recognition system includes a processor configured to receive unlabeled tracking samples collected from one or more person trackers and to execute one or more algorithms to construct pairwise constraints between the unlabeled tracking samples.

In a second embodiment, a method for tracking and recognition of people is provided. The method includes generating tracking samples from one or more person trackers of a tracking system. The method also includes receiving unlabeled tracking samples from the generated tracking samples into a data buffer for a time span. The method further includes generating weighted pairwise constraints between the unlabeled tracking samples. The method yet further includes generating clusters via spectral clustering of the unlabeled tracking samples with weighted pairwise constraints. The method still further includes learning a respective appearance signature model for each respective cluster.

In a third embodiment, a non-transitory, computer-readable media including one or more routines which executed by at least one processor causes acts to be performed is provided. The acts include receiving unlabeled tracking samples collected from one or more person trackers. The acts also include generating weighted pairwise constraints between the unlabeled tracking samples. The acts further include generating clusters via spectral clustering of the unlabeled tracking samples with weighted pairwise constraints. The acts yet further include learning in an online and discriminative manner a respective appearance signature model for each respective cluster.

BRIEF DESCRIPTION OF THE DRAWINGS

These and other features and aspects of the present embodiments will become better understood when the following detailed description is read with reference to the accompanying drawings in which like characters represent like parts throughout the drawings, wherein.

DETAILED DESCRIPTION

In the subsequent paragraphs, various aspects of identifying and tracking multiple people will be explained in detail. The various aspects of the present techniques will be explained, by way of example only, with the aid of figures, hereinafter. The present techniques for identifying and tracking multiple people will generally be described by reference to an exemplary tracking and recognition system (e.g., trajectory-based tracking and recognition system) designated by numeral 10.

Figure 1:
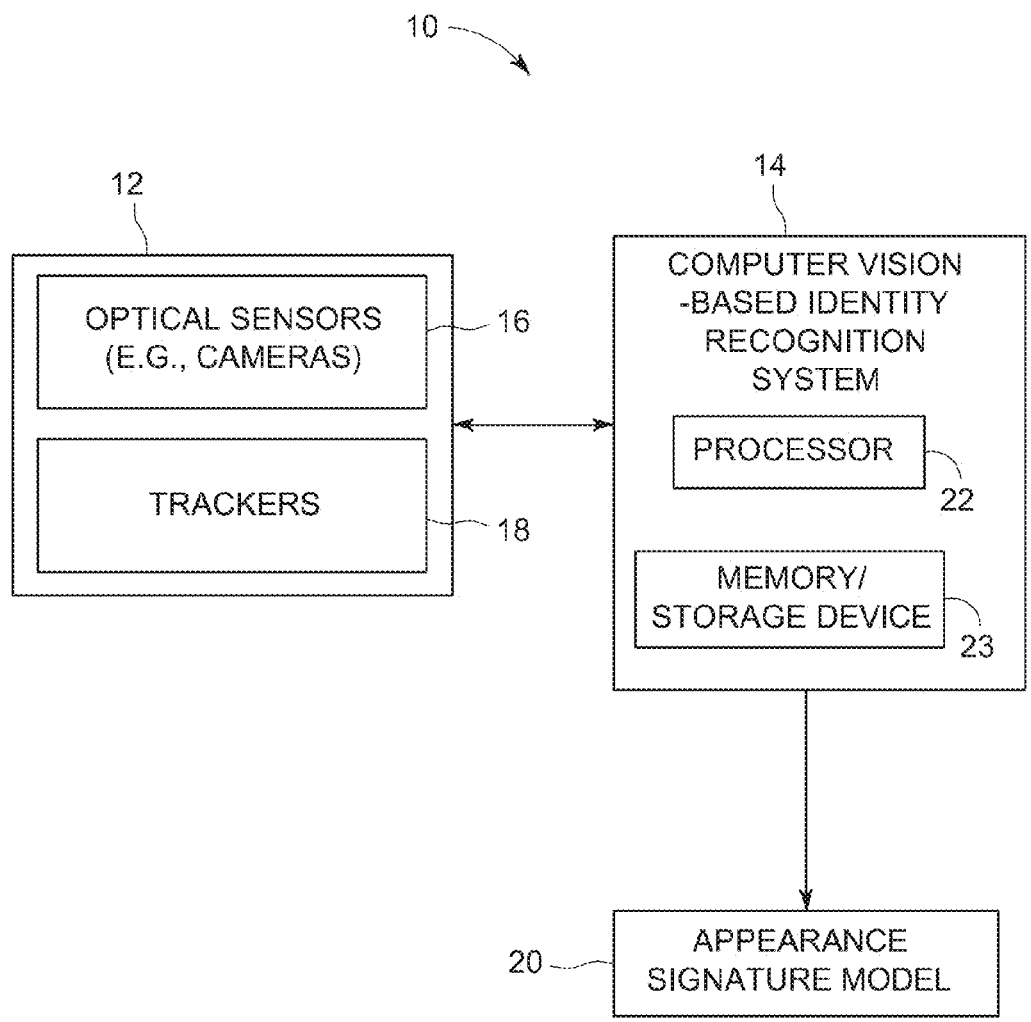
FIG. 1 is a diagrammatic view of an exemplary tracking system, in which recognition of people is implemented in accordance with embodiments of the present disclosure.

The tracking and recognition system 10 depicted in FIG. 1 is configured to track people despite tracking errors (e.g., temporary trajectory losses and/or identity switches) that may occur. These tracking errors may result in noisy data or samples that include spatiotemporal gaps. The tracking and recognition system 10 is configured to handle the noisy data to enable the recognition and tracking of multiple people. The tracking and recognition system 10 includes a tracking subsystem 12 and a computer vision-based identity recognition system 14.

The tracking subsystem 12 operates continuously in real-time to monitor people's activities in an area of interest. In particular, the tracking subsystem 12 includes one or more optical sensors 16 (e.g., cameras). Live video streams from multiple cameras 16 are calibrated into a common 3D coordinate as described in greater detail below. One or more person trackers 18 utilize the video streams from the cameras 16 to track one or more respective persons via data association and filtering using the detection returned from a generic person detector and its cropped appearance sample from each camera view as described in greater detail below. The tracker 18 is a computer entity that understands image content and may track the same object (e.g., person) over time.

The computer vision-based identity recognition system 14 (e.g., a semi-supervised data clustering and discriminative signature model learning system) is configured to utilize the noisy data from the tracking subsystem 12 to learn the appearance signature models of people in an online manner. In particular, the online learning of the computer vision-based identity recognition system 14 includes receiving a set of training data and classifying the training data, while updating the classified data over time with new data. For online learning, the computer vision-based identity recognition system 14 may utilize a type of machine learning such as semi-supervised learning. In semi-supervised learning, the computer vision-based identity recognition system 14 utilizes a large amount of unlabeled data (e.g., unlabeled tracking samples) and a small amount of labeled data (e.g., previously learnt discriminative appearance signal models). Specifically, the computer vision-based identity recognition system 14 is configured to recognize one or more persons, without a priori knowledge of the respective persons, via an online discriminative learning of appearance signature models 20 (e.g., discriminative appearance signature model) of the respective persons. In other words, the computer vision-based identity recognition system 14 does not rely on any previously learned individual models, but identifies a person through an appearance signature using an online learned and continuously updated identity pool. In order to benefit the learning process, the computer vision-based identity recognition system 14 constrains the training data by analyzing the fidelity of tracked trajectories in terms of spatial locality and temporal continuity, which helps categorizes the data. In particular, the computer vision-based identity recognition system 14 utilizes a multi-step approach to learn each appearance signature model 20 by constructing pairwise constraints for the unlabeled tracking samples, categorizing samples by solving a clustering problem with pairwise constraints, and learning a large-margin based discriminative signature model 20 for each data cluster to be maintained and carried over in an online mode within the identity pool.

The computer vision-based identity recognition system 14 includes a processor 22 to implement the multi-step approach to learn each appearance signature model 20. The processor 22 is configured to receive unlabeled tracking samples (e.g., noisy samples with spatiotemporal gaps) collected from the one or more person trackers 18. As described in greater detail below the tracking process of the tracking subsystem 12 and the signature model learning of the computer vision-based identity recognition system 14 may be coupled in a batch processing manner. In particular, the processor 22 may receive and buffer the unlabeled tracking samples in an online and asynchronous mode. For example, once a data buffer of the processor 22 for a time span reaches a threshold size based on the unlabeled tracking samples received, the processor 22 activates pairwise constraint generation, clustering, and learning processes. In certain embodiments, a portion of the received unlabeled tracking samples in the data buffer overlap from two successive time spans.

The processor 22 is configured to execute one or more algorithms (which may be stored as executable code in a memory and/or storage device 23 of the computer vision-based identity recognition system 14) to implement each step of the multi-step approach to learn each appearance signature model. In particular, such executable code may cause, when executed, the processor 22 to construct pairwise constraints between the received unlabeled tracking samples. For example, the pairwise constraints may represent that two samples must belong to one person (e.g., must-link constraint) and/or that two samples cannot belong to one person (e.g., cannot-link constraint) as described in greater detail below. In certain embodiments, each pairwise constraint may be weighed between the unlabeled tracking samples, for example, by estimating the likelihood that the constraint should be enforced. Also, the executable code may cause, when executed, the processor 22 to cluster (e.g., spectral cluster) the unlabeled tracking samples with weighted pairwise constraints. As described in greater detail below, the processor 22 may utilize a kernel learning based function for spectral clustering. In addition, the executable code may cause, when executed, the processor 22 to learn a respective appearance signature model 20 (e.g., discriminative appearance signature model). For example, the processor 22 may learn a new appearance signature model or update a maintained appearance signature model. As described in greater detail below, the processor 22 may utilize a support vector machine (SVM) (e.g., multi-class SVM) to learn the respective appearance signature model 20 for each cluster of unlabeled tracking samples. An incremental SVM may be utilized in updating the maintained appearance signature model. In certain embodiments, the computer vision-based identity recognition system 14 may include a special purpose processor configured to implement the steps described above.

Figure 2:
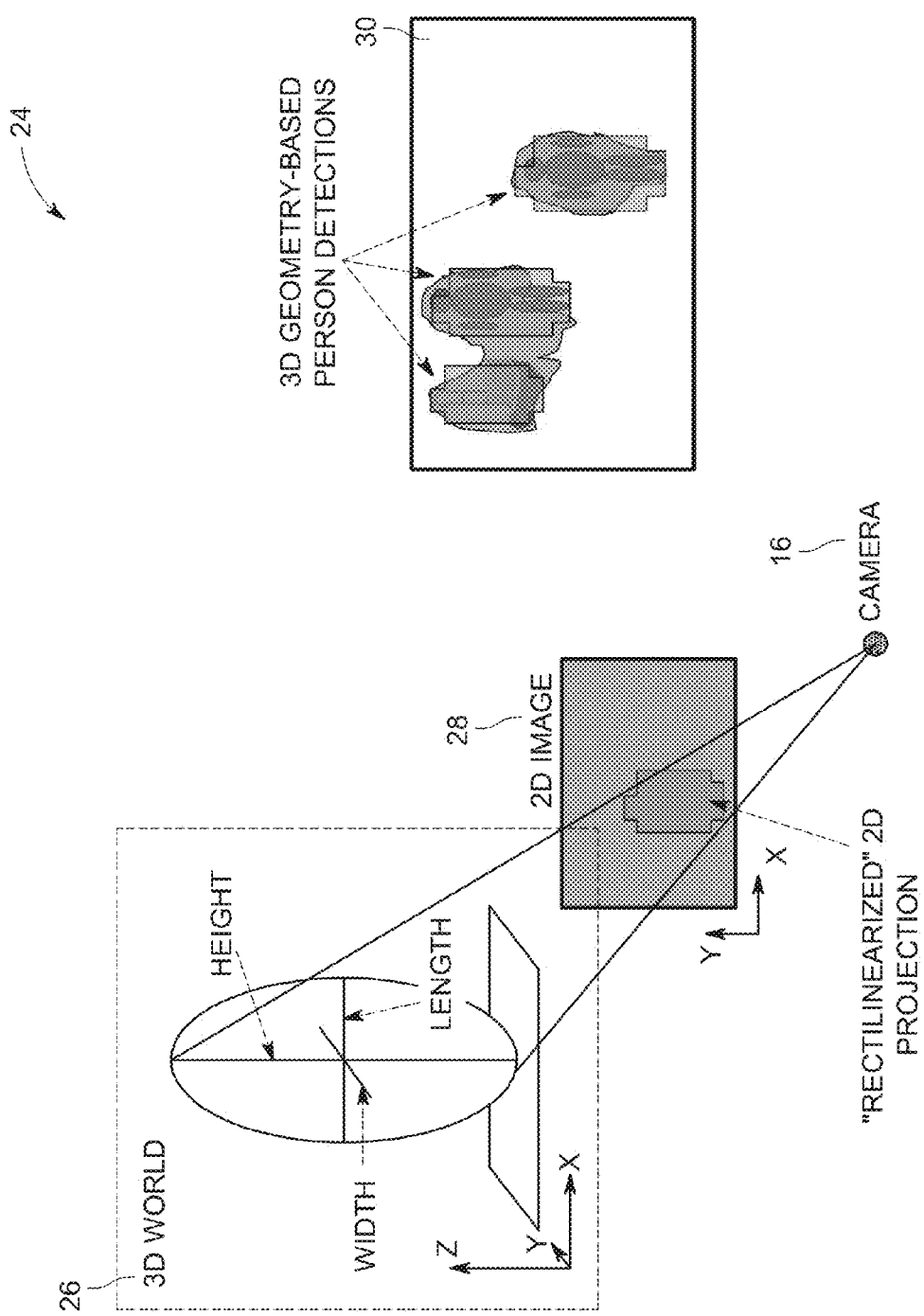
FIG. 2 is a schematic of three-dimensional geometry-based person detection for use with embodiments of the present disclosure.

FIG. 2 is a schematic of a three-dimensional geometry-based person detection system 24 for use with embodiments of the present disclosure (e.g., tracking subsystem 12). Determining where the specific agent (e.g., person) that is detected is achieved by characterizing physical X-Y measures in a 2D space using one camera sensor or by X-Y-Z in 3D using more than one camera. Cameras or optical sensors 16 of system 24 operate in a calibrated fashion, where the correspondence between the 3D world coordinate system 26 and 2D image spaces 28 can be established. Hence, a detailed 3D human body model may be crafted based on the physical dimension of a human and stands on a ground plane. The model's projection onto the image plane can be used to explain the extracted foreground regions and nominate a hypothesized set of ground plane locations that may be occupied by people 30.

Figure 3:
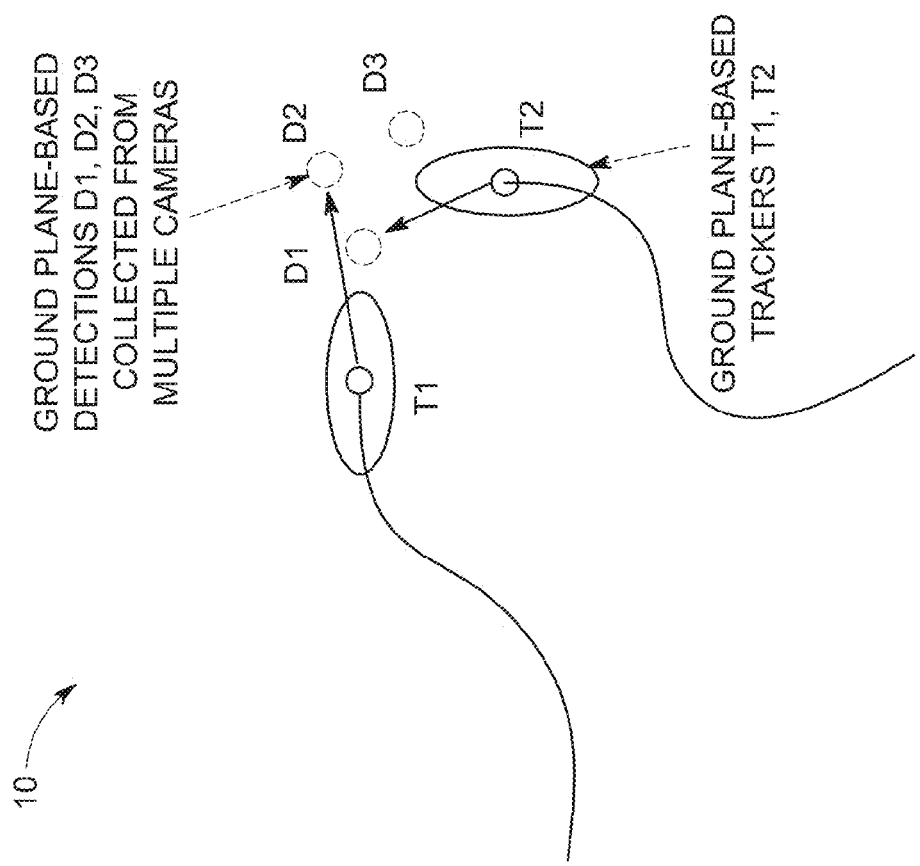
FIG. 3 is a schematic of a multi-camera, multi-person tracking system for use with embodiments of the present disclosure.

Referring to FIG. 3, a schematic of a multi-camera, multi-person tracking and recognition system 10 is illustrated, according to an embodiment of the present disclosure. The multi-camera, multi-person tracking and recognition system 10 is useable with the tracking subsystem 12 and the computer vision-based identity recognition system 14 to differentiate agents (e.g., persons) in the monitored space. The multi-person tracking in one embodiment is performed in a centralized fashion once person detections from each camera sensor 18 are received and time ordered. Each newly detected person will be assigned with a new tracker 18 with a unique tracker ID that operates on the ground plane in a virtual semantic scene space. The tracker 18 may include 3D ground plane-based trackers maintained in real time. As mentioned above, the tracking samples collected from the trackers 18 are provided to the computer vision-based identity recognition system 14 to recognize one or more persons via online discriminative learning of appearance signature models 20. The trajectory filtering/smoothing of each tracker 18 is also performed on the ground plane in such a centralized fashion, enabling the system to provide a continuous meta-data stream in the form of person locations as a function of time (i.e., real-time).

Figure 4:
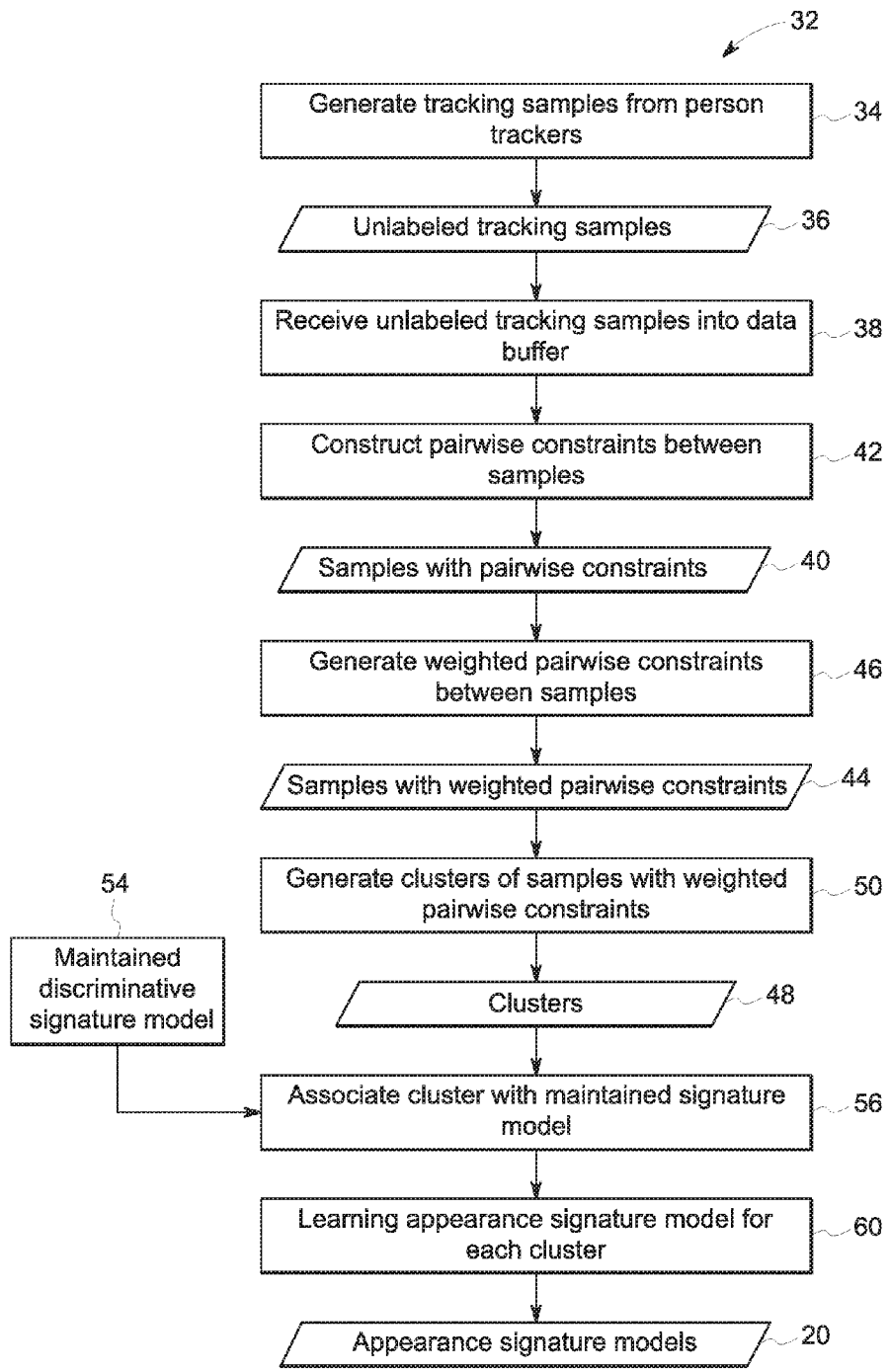
FIG. 4 is a flow chart illustrating a method for tracking and recognizing people using the tracking system of FIG. 1 in accordance with embodiments of the present disclosure.
Figure 5:
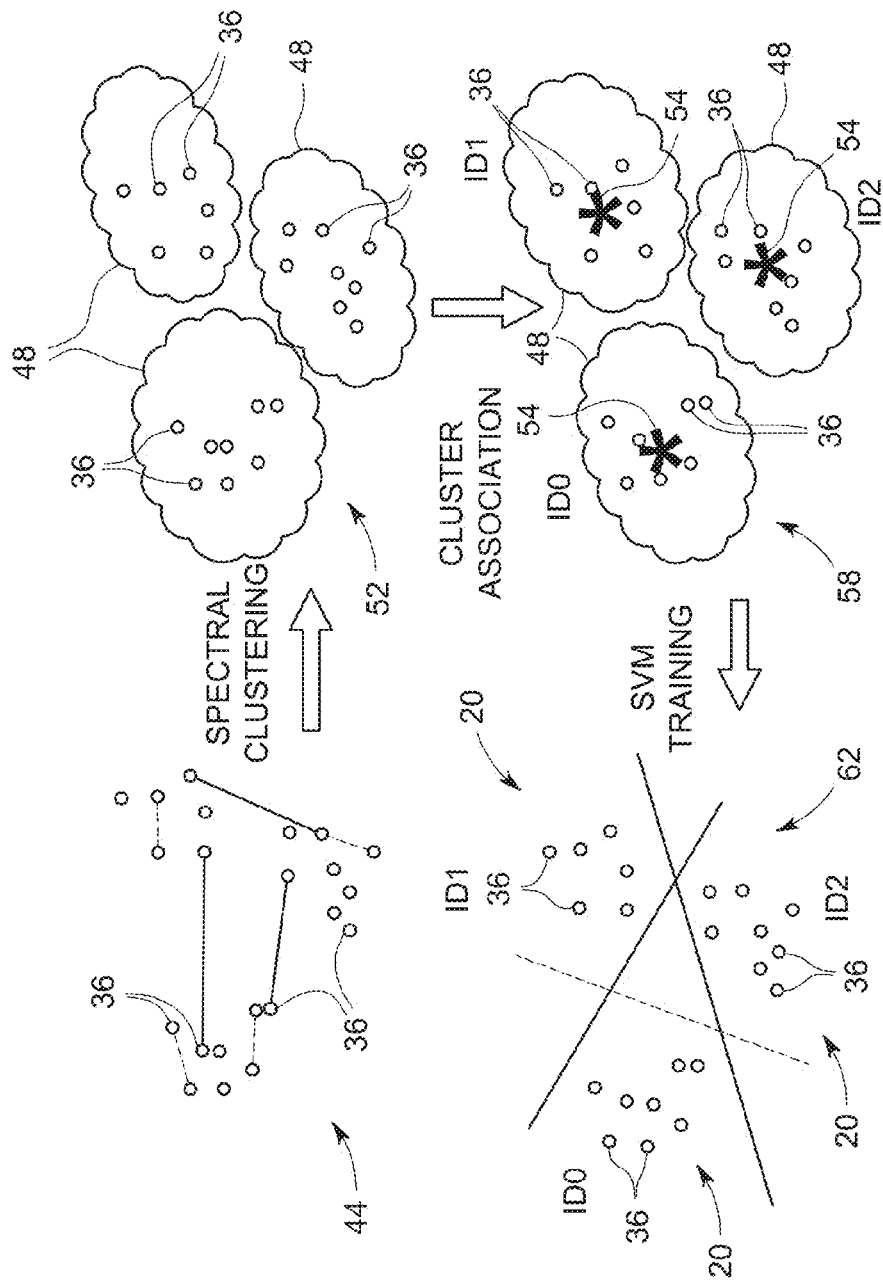
FIG. 5 is a schematic illustrating learning of appearance signature models using the tracking system of FIG. 1 in accordance with embodiments of the present disclosure.

FIG. 4 is a flow chart illustrating a method 32 for tracking and recognizing people using the tracking and recognition system 10 of FIG. 1. FIG. 5 illustrates the learning of appearance signature models described in method 32. The method 32 includes generating tracking samples from one or more person trackers 18 of the tracking subsystem 12 (block 34). The data buffer of the computer vision-based identity recognition system 14 (i.e., processor 22) receives unlabeled tracking samples 36 from the generated samples for a given time span. In one embodiment, the computer vision-based identity recognition system 14 receives the unlabeled tracking sample (block 38), via batch processing, in an online and asynchronous mode. As described in greater detail below, the data buffer must reach a threshold size before activation of the generation of pairwise constraints between the unlabeled tracking samples 36 and clusters, and online discriminative learning of a respective appearance signature model 20 for a respective cluster.

The method 32 also includes constructing pairwise constraints 40 between the unlabeled tracking samples 36 (block 42). Constructing pairwise constraints 40 enables analyzing the spatial and temporal properties of the tracking trajectories of the samples 36. Reference numeral 44 of FIG. 5 illustrates the samples with pairwise constraints 40. As depicted in FIG. 5, dots represent the unlabeled tracking samples 36. A dashed line represents a must-link constraint between the samples 36 and a solid line represents a cannot-link constraint between the samples 36. The relationship in a must-link constraint is that two samples 36 are cropped from the same tracker 18 (i.e., a single tracker). The relationship in a cannot-link constraint is that two samples 36 are from different trackers 18.

In addition, the method 32 includes generating weighted pairwise constraints 44 between the unlabeled tracking samples 36 based on the samples 36 with pairwise constraints 40 (block 46). Each constraint is weighed by estimating how likely the constraint should be enforced. For example, assuming that a total of N persons are being tracked in V camera views, $T_i$ denotes the i-th tracker, $i \in \{1, \ldots, N\}$, and $v \in \{1, \ldots, V\}$ representing the i-th camera view. At time t, $x_i^t$ and $x_i^{t,v}$ represent the 3D world coordinate of the tracker $T_i$ and its projected 2D image position into camera view v. Also, $s_i^t$ represents the appearance sample collected from tracker $T_i$ at time t, and $s_i^{t,v}$ represents its appearance component from camera view v.

A must-link relationship enables the measurement of the fidelity of the tracking system that the person tracker 18 is very unlikely to be getting confused with others. Thus, the further apart the tracker 18 is from all other trackers 18 in any other camera views, the more confident the system can be at dedicating this tracker 18 to follow the same person over time. Thus, a high likelihood value of such a must-link constraint should be assigned between the pairs of appearance samples collected from this tracker 18 over successive frames. Mathematically, the likelihood of the must-link constraint between collected appearance samples $s_i^t$ and $s_i^{t-1}$ can be defined as:

$$C_m(s_i^t, s_i^{t-1}) = \text{sig}[\min_v(w_i^{t,v} \cdot w_i^{t-1,v})], \quad (1)$$

where $$\text{sig}(x) = \frac{1}{1 + e^{-\lambda x}}$$

is a sigmoid function with parameter $\lambda$, and $w_i^{t,v}$ represents the healthiness score of tracker $T_i$ in view v at time t, which by definition measures the confidence of tracker $T_i$ not getting confused with others in view v. The healthiness score $w_i^{t,v}$ is defined as:

$$w_i^{t,v} = 1 - \frac{\sum_{j \neq i} |R_i^{t,v} \cup R_j^{t,v}|}{|R_i^{t,v}|}, \quad (2)$$

with $|R_i^{t,v}|$ denoting the size of $R_i^{t,v}$.

Similar to the must-link relationship, the cannot-link relationship measures how confident a tracking system is that two collected appearance samples for two trackers 18 are actually from two different persons. Thus, for one camera view, if the projections of two trackers 18 at time t into this view are apart from each other, it is very likely that the two samples are from two different persons. Mathematically, the cannot-link likelihood of any pair of samples collected at time t, $s_i^t$ and $s_j^t$ can be defined as:

$$C_m(s_i^t, s_j^t) = \text{sig}[\max_v \|x_i^{t,v} - x_j^{t,v}\|_2]. \quad (3)$$

After generating the samples with the weighted pairwise constraints 44 (block 46), the method 32 includes generating clusters 48 via spectral clustering of the samples with weighted pairwise constraints 44 (block 50). Reference numeral 52 of FIG. 5 illustrates the clusters 48 of samples with weighted pairwise constraints 44. The processor 22 utilizes a kernel learning based function for the constrained spectral clustering. Given a set of n appearance samples $S = \{s_1, \ldots, s_n\}$, if we know the true binary k-cluster indicator matrix $Y = (y_{ij})$ of size $n \times k$ where $y_{ij} = 1$ if $s_i$ is in the j-th ground truth cluster and $y_{ij} = 0$ otherwise, then $n \times n$ matrix $\Psi = YY^T$ depicts all possible pairwise constraints between any pair of samples, e.g $\Psi_{i,j} = 1$ if $s_i$ and $s_j$ must be in the same cluster, and $\Psi_{i,j} = 0$ if they cannot. While an ideal kernel is $K = \Psi$, in reality only some elements of $\Psi$ are known through the observed pairwise constraints. Thus, a kernel matrix K that approximates the known pairwise constraints as close as possible is utilized, which leads to the following objective function, $$\min_K \|C \circ (K - P)\|_F^2 \quad (4)$$

where $\circ$ denotes element-wise product, $\|\cdot\|_F$ denotes the Frobenius norm of a matrix and two $n \times n$ matrices P and C describe, respectively, the known pairwise constraints in $\Psi$ and the confidence in these know pairwise constraints. More specifically each element of P, $P_{ij}$, indicates whether sample $s_i$ and $s_j$ belong to the same cluster ($P_{ij} = 1$) or not ($P_{ij} = 0$). Since sample $s_i$ always belongs to the same cluster as itself, the dialog elements of P, $P_{ii}$, is always 1. C is a symmetric matrix, where $0 < C_{ij} = C_{ji} \leq 1$ represents the likelihood (or confidence) that the must-link or cannot-link constraint between samples $s_i$ and $s_j$ is known. Thus, $C_{ii} = 1$, $i \in \{1, \ldots, n\}$, and $C_{ij} = 0$ if there is no constraint for samples $s_i$ and $s_j$. Other values in C are computed by (1) or (3) during the sample collection process as previously described.

In addition, it is desired that the kernel matrix K preserves the proximity structure of the data, which is represented by the smooth eigenvectors of the nonnegative symmetric matrix, $W = (W_{ij})$, with $$W_{ij} = \frac{\sum_{v=1}^{V} w_i^v w_j^v \phi(s_i^v, s_j^v)}{\sum_{v=1}^{V} w_i^v w_j^v} \quad (5)$$

where $s_i^v$ is the components of $s_i$ in camera view v, $w_i^v$ is the healthiness score of sample $s_i$ in view v at the time when the sample $s_i$ was collected (see (2)), and $\phi(x, y)$ represents any similarity measure between two samples. Such proximity requirement can be added as a constraint to the optimization problem, $K=\sum_{i=1}^{k}\beta_i u_i u_i^T$, where $\beta_1 \geq \ldots \geq \beta_k \geq 0$, $u_i$ is the eigenvector corresponding to the i-th smallest eigenvalue of the normalized graph Laplacian $\bar{L}=I-D^{-1/2}WD^{-1/2}$, with I the identity matrix of size n×n and D=diag ($d_1, \ldots, d_n$) with $d_i=\sum_{j=1}^{n} W_{ij}$.

Therefore, kernel matrix K is learned by solving the following optimization problem:

$$\min_{\beta_1,\ldots,\beta_n} \|C \circ (K-P)\|_F^2 \quad (6)$$

$$\text{s.t. } K=\sum_{i=1}^{k}\beta_i u_i u_i^T, \quad (7)$$

$$\beta_1 \geq \ldots \geq \beta_k \geq 0 \quad (8)$$

It can be shown that this is essentially a quadratic programming problem and can be solved efficiently. Once the optimal kernel K is learned, the final k target clusters can be formed by applying k-means algorithms to the rows of $(\sqrt{\beta_1}u_1, \ldots, \sqrt{\beta_k}u_k)$.

In certain embodiments, the method 32 includes associating maintained discriminative signature models 54 (i.e., previously learnt model from prior time span) from the identity pool with one of the generated clusters 48 (block 56). Reference numeral 58 of FIG. 5 illustrates the association of the clusters 48 with the maintained discriminative signature models 54. The stars in FIG. 5 represent the maintained discriminative signature models 54.

After generating the clusters 48 (block 50), the method 32 includes learning appearance signature models 20 (e.g., discriminative appearance signature models) for each cluster 48 (block 60). When a respective cluster 48 is associated with a respective maintained discriminative signature model 54, learning the appearance signature model 20 (block 60) includes updating the appearance signature model 20 (i.e., maintained discriminative signature model 54) with the new samples 36. In certain embodiments, learning the appearance signature model 20 (block 60) includes learning a new appearance signature model 20 for inclusion within the identity pool. Reference numeral 62 of FIG. 5 illustrates the sample data 36 associated with the learned appearance signature models 20. The processor 22 utilizes a SVM to model each identity signature. Since the number of identities can vary over time, a multi-class SVM with clustered data is learned. Since the identity pool generated with the multi-class SVM evolves over time, the processor 22 utilizes an incremental SVM learning scheme. The incremental SVM learner continuously updates itself once new data (e.g., training samples 36) become available.

Figure 6:
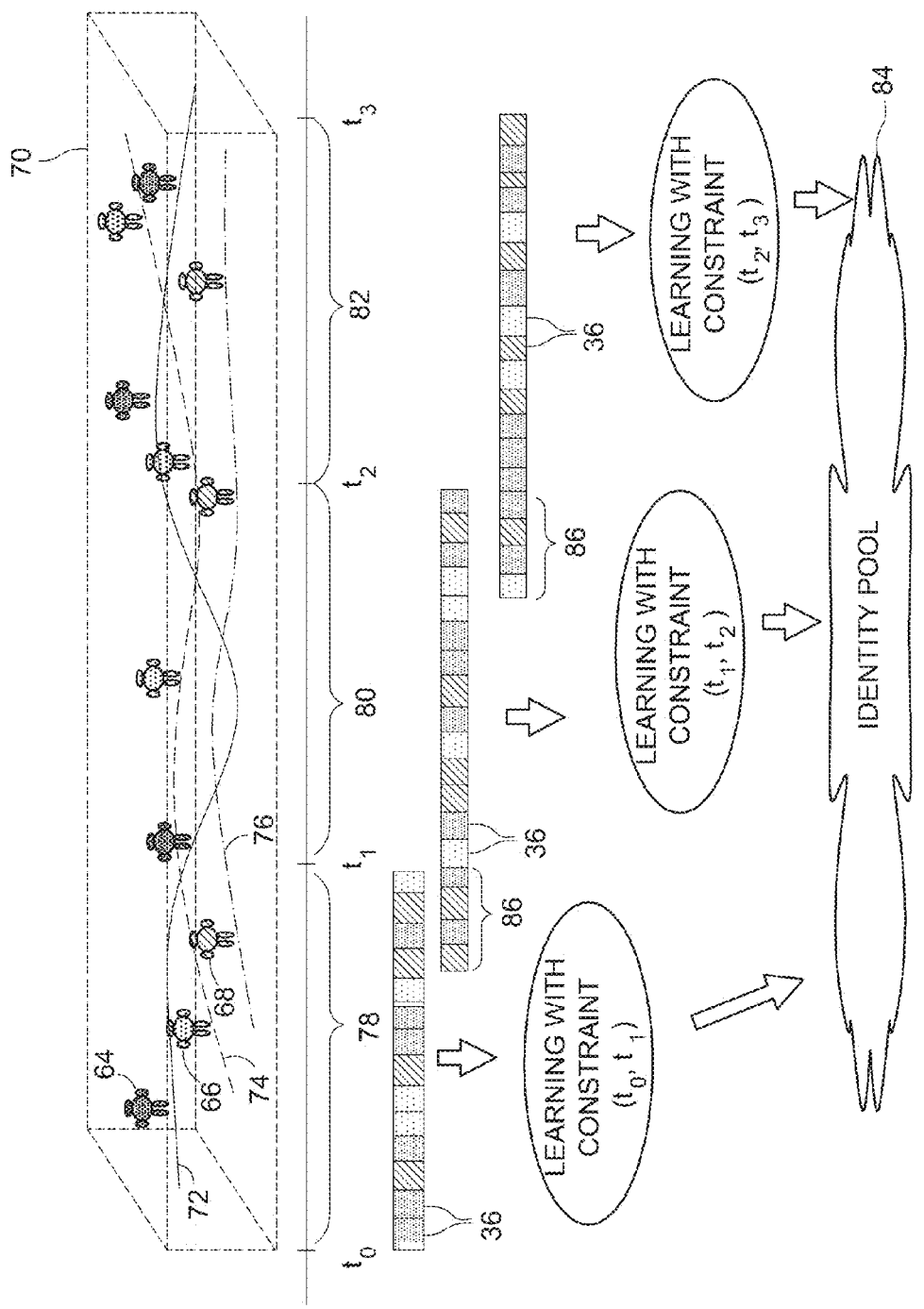
FIG. 6 is a schematic illustrating procedures for online learning of appearance signature models using the tracking system of FIG. 1 in accordance with embodiments of the present disclosure.

As mentioned above, the signature model learning and the multi-person tracking are coupled in a batch processing manner. FIG. 6 illustrates procedures for the online learning of appearance signature models 20 in a batch processing manner. Each puppet 64 (dark shading), 66 (light shading), 68 (cross-hatch) represents the true locations and identities of individuals in a spatiotemporal video volume 70. Each curve 72 (solid line), 74 (dashed line), 76 (dotted-dashed line) represents an estimated trajectory for each respective individual (i.e., puppet 64, 66, 68) over successive time spans 78 (i.e., $t_0$, $t_1$), 80 (i.e., $t_1$, $t_2$), 82 (i.e., $t_2$, $t_3$). The tracking process (e.g., via tracking subsystem 12) continuously generates appearance samples 36 that are extracted from the projected image regions of all maintained 3D trackers 18. As mentioned above, the discriminative signature learning process first receives and buffers these samples 36 in an online but asynchronous mode. In particular, given each time span ($t_{n-1}$, $t_n$) (e.g., time spans 78, 80, 82), appearance samples 36 are harvested into the data buffer. The illustrated appearance samples 36 represent the respective individuals (i.e., puppet 64, 66, 68). Once the data buffer collects enough data over a time span (i.e., reaches a threshold size), for example at $t_1$, $t_2$, and $t_3$, the generation of the weighted pairwise constraints, the constrained clustering, and the incremental SVM-based signature model learning are activated to process the newly received data stream for that respective time span (e.g., time spans 78, 80, 82). This enables periodic activation of these processes.

To maintain consistent discriminative models over time spans within the identity pool 84, sample buffers of two successive spans have some overlap (i.e., clustering and discriminative learning re-use samples 36 in the overlapped span). For example, as depicted in FIG. 6, the samples 36 within overlapping region 86 of time spans 78 and 80 and overlapping region 88 of time spans 80 and 82 may be re-used in the clustering and learning processes for time spans 80 and 82, respectively. Carrying over some of the samples 36 between successive time spans ensures temporal continuity. The signature models 20 within the identity pool 84 are updated after each round of learning.

A technical contribution for the disclosed method and system is that it provides for a computer implemented system and method for trajectory-based tracking and recognition of multiple people.

The disclosed embodiments may be interfaced to and controlled by a computer readable storage medium having stored thereon a computer program. The computer readable storage medium may include a plurality of components such as one or more of electronic components, hardware components, and/or computer software components. These components may include one or more computer readable storage media that generally store instructions such as software, firmware and/or assembly language for performing one or more portions of one or more implementations or embodiments of an algorithm as discussed herein. These computer readable storage media are generally non-transitory and/or tangible. Examples of such a computer readable storage medium include a recordable data storage medium of a computer and/or storage device. The computer readable storage media may employ, for example, one or more of a magnetic, electrical, optical, biological, and/or atomic data storage medium. Further, such media may take the form of, for example, floppy disks, magnetic tapes, CD-ROMs, DVD-ROMs, hard disk drives, and/or solid-state or electronic memory. Other forms of non-transitory and/or tangible computer readable storage media not list may be employed with the disclosed embodiments.

A number of such components can be combined or divided in an implementation of a system. Further, such components may include a set and/or series of computer instructions written in or implemented with any of a number of programming languages, as will be appreciated by those skilled in the art. In addition, other forms of computer readable media such as a carrier wave may be employed to embody a computer data signal representing a sequence of instructions that when executed by one or more computers causes the one or more computers to perform one or more portions of one or more implementations or embodiments of a sequence.

Technical effects of the disclosed embodiments include systems and methods for trajectory-based tracking and recognition of multiple persons. In particular, the disclosed embodiments utilize a computer vision-based identity recognition system 14 to recognize one or more persons without a priori knowledge of the respective persons via an online discriminative learning of appearance signature models 20 of the respective persons using noisy, unlabeled tracking samples 36. The computer vision-based identity recognition system 14 utilizes a multi-step approach in learning the appearance signature models 20 (e.g., new or updated models) that includes constructing pairwise constraints between the samples 36, categorizing the samples 36 into clusters 48, and learning a large-margin based discriminative signature model 20 for each respective cluster 48.

This written description uses examples, including the best mode, to enable any person skilled in the art to practice the disclosed embodiments, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for tracking and recognition of people, comprising:
    generating tracking samples from one or more person trackers of a tracking system;
    receiving unlabeled tracking samples from the generated tracking samples into a data buffer for a time span;
    generating weighted pairwise constraints between the unlabeled tracking samples;
    generating clusters via spectral clustering of the unlabeled tracking samples with weighted pairwise constraints; and
    utilizing, via a processor, continuously updated discriminative learning to create a respective appearance signature model for each respective cluster;
    wherein the data buffer reaching a threshold size from the received unlabeled tracking samples activates the generation of the weighted pairwise constraints between the unlabeled tracking samples and the clusters and the continuously updated online discriminative learning of the respective appearance signature model for each respective cluster.

2. The method of claim 1, wherein the one or more person trackers comprise 3D ground plane-based trackers maintained in real-time, and generating tracking samples comprises extracting projected image regions from the 3D ground plane-based trackers.

3. The method of claim 1, receiving the unlabeled tracking samples, via batch processing, in an online and asynchronous mode.

4. The method of claim 1, wherein a portion of the received unlabeled tracking samples in the data buffer overlap from two successive time spans.

5. The method of claim 1, wherein the weighted pairwise constraints comprise a must-link constraint between two tracking samples from a single tracker and a cannot-link constraint between two tracking samples from different trackers.

6. The method of claim 1, wherein the respective appearance signature model comprises a new appearance signature model or an updated appearance signature model.

7. A non-transitory, computer-readable media comprising one or more routines which executed by at least one processor causes acts to be performed comprising:
    receiving unlabeled tracking samples collected from one or more person trackers into a data buffer for a time span;
    generating weighted pairwise constraints between the unlabeled tracking samples;
    generating clusters via spectral clustering of the unlabeled tracking samples with weighted pairwise constraints; and
    utilizing, via the at least one processor, continuously updated discriminative learning to create a respective appearance signature model for each respective cluster;
    wherein the data buffer reaching a threshold size from the received unlabeled tracking samples activates the generation of the weighted pairwise constraints between the unlabeled tracking samples and the clusters and the continuously updated online discriminative learning of the respective appearance signature model for each respective cluster.

8. The non-transitory, computer-readable media of claim 7, wherein the weighted pairwise constraints comprise a must-link constraint between two tracking samples from a single tracker and a cannot-link constraint between two tracking samples from different trackers.

9. The non-transitory, computer readable media of claim 8, wherein the at least one processor utilizes a multi-class support vector machine to learn the respective appearance signature model for each respective cluster.

10. The non-transitory, computer readable media of claim 9, wherein the multi-class support vector machine comprises an incremental support vector machine that continuously updates itself upon receiving new data.

* * * * *